US009649877B2

(12) United States Patent
Salter et al.

(10) Patent No.: US 9,649,877 B2
(45) Date of Patent: May 16, 2017

(54) VEHICLE LIGHT SYSTEM WITH ILLUMINATING WHEEL ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 14/509,561

(22) Filed: Oct. 8, 2014

(65) Prior Publication Data

US 2015/0138804 A1    May 21, 2015

Related U.S. Application Data

(63) Continuation-in-part of application No. 14/086,442, filed on Nov. 21, 2013.

(51) Int. Cl.
*B60Q 1/00* (2006.01)
*B60Q 1/26* (2006.01)
*B60B 7/00* (2006.01)
*B60Q 1/32* (2006.01)

(52) U.S. Cl.
CPC ............... *B60B 7/00* (2013.01); *B60B 7/006* (2013.01); *B60Q 1/326* (2013.01); *B60B 2900/572* (2013.01)

(58) Field of Classification Search
CPC .... B60B 7/006; B60B 2900/572; B60Q 1/326
USPC ......................................... 362/500, 509–511
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,207,077 B1 | 3/2001 | Burnell-Jones |
| 6,436,314 B1 | 8/2002 | Oshima et al. |
| 6,494,490 B1 | 12/2002 | Trantoul |
| 6,577,073 B2 | 6/2003 | Shimizu et al. |
| 6,641,041 B2 | 11/2003 | Olds et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |

(Continued)

FOREIGN PATENT DOCUMENTS

| | | |
|---|---|---|
| CN | 2579686 Y | 10/2003 |
| CN | 201169230 Y | 12/2008 |

(Continued)

*Primary Examiner* — Jason Moon Han
(74) *Attorney, Agent, or Firm* — Jason Rogers; Price Heneveld LLP

(57) ABSTRACT

An illumination apparatus for a vehicle is disclosed. The illumination apparatus comprises a photoluminescent portion disposed on a surface of a first component of a vehicle wheel assembly. The illumination apparatus further includes a light source located proximate the first component. The light source is configured to emit light at a first wavelength directed toward the photoluminescent portion. The photoluminescent portion is configured to convert the first wavelength to at least a second wavelength to illuminate the wheel assembly.

20 Claims, 8 Drawing Sheets

(56) References Cited

U.S. PATENT DOCUMENTS

| | | | |
|---|---|---|---|
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,001,051 B2 | 2/2006 | Palmer et al. | |
| 7,150,549 B2 * | 12/2006 | Olds | B60Q 1/326 362/464 |
| 7,161,472 B2 | 1/2007 | Strumolo et al. | |
| 7,213,923 B2 | 5/2007 | Liu et al. | |
| 7,234,498 B2 | 6/2007 | Agostini | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,651,243 B2 | 1/2010 | McGuire, Jr. et al. | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 101337492 A | 1/2009 |
| CN | 201193011 Y | 2/2009 |
| CN | 201863626 U | 6/2011 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2013085049 A1 | 6/2013 |
| WO | 2013105482 | 6/2013 |
| WO | 2014068440 A1 | 5/2014 |

* cited by examiner

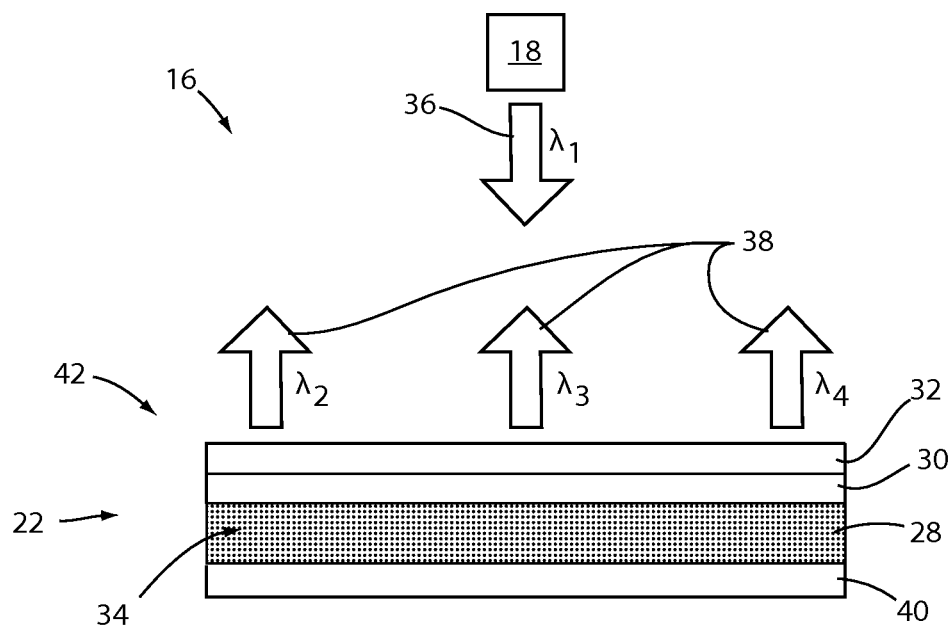
FIG. 3
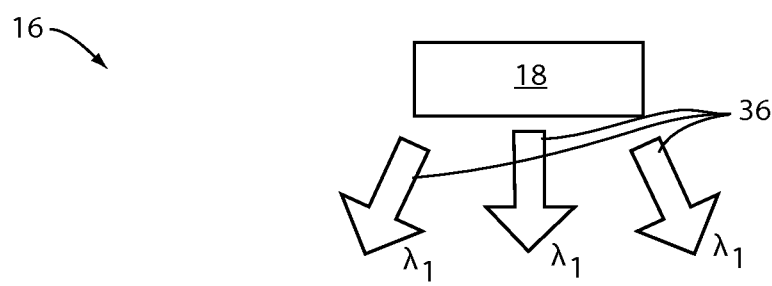
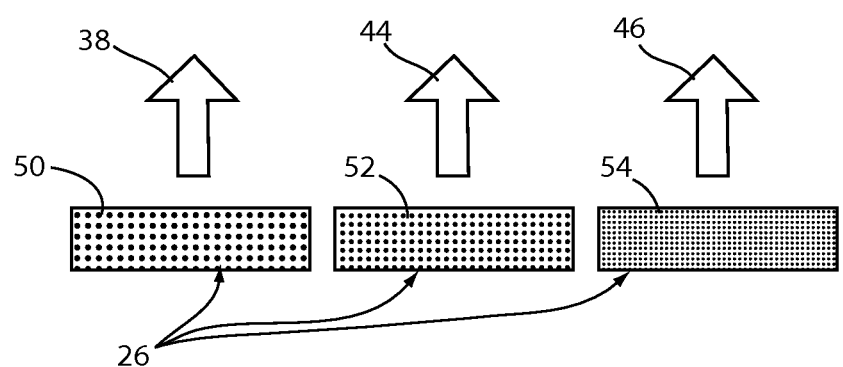
FIG. 4

VEHICLE LIGHT SYSTEM WITH ILLUMINATING WHEEL ASSEMBLY

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present invention, an illumination apparatus for a vehicle wheel assembly is disclosed. The illumination apparatus comprises a photoluminescent portion disposed on a first component of a wheel assembly. The illumination apparatus further includes a light source located on a second component of the wheel assembly. The light source is configured to emit light at a first wavelength directed toward the photoluminescent portion. The photoluminescent portion is configured to convert the first wavelength to a second wavelength.

According to another aspect of the present invention, an illumination system for a vehicle wheel assembly is disclosed. The assembly comprises a photoluminescent portion disposed on a component of the assembly. The assembly further includes a generator coupled to the wheel assembly to generate power. Additionally, a light source faces the photoluminescent portion and is powered by the generator and configured to emit light at a first wavelength. The photoluminescent portion is configured to convert the first wavelength to a second wavelength.

According to yet another aspect of the present disclosure, a lighting system for an automobile wheel assembly is disclosed. The assembly comprises a light source configured to emit light at a first wavelength disposed on a first wheel assembly component and powered by an automobile electrical system. The assembly further includes a photoluminescent portion coupled to a second wheel assembly component. The photoluminescent portion is configured to convert the first wavelength to a second wavelength.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 illustrates the lighting system configured to convert a first emission of light to a second emission of light according to one embodiment;

FIG. 4 is a schematic diagram illustrating the lighting system configured to convert a first emission of light to a plurality of emissions of light according to another embodiment;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of a vehicle wheel assembly. In some implementations, a light source may be configured to illuminate a photoluminescent portion corresponding to at least one wheel assembly component, feature, and/or any other portion of the vehicle located proximate the wheel assembly. In various implementations, a first photoluminescent portion may correspond to illuminate a first wheel assembly component. A second photoluminescent portion may correspond to illuminate a second wheel assembly component.

Figure 1:
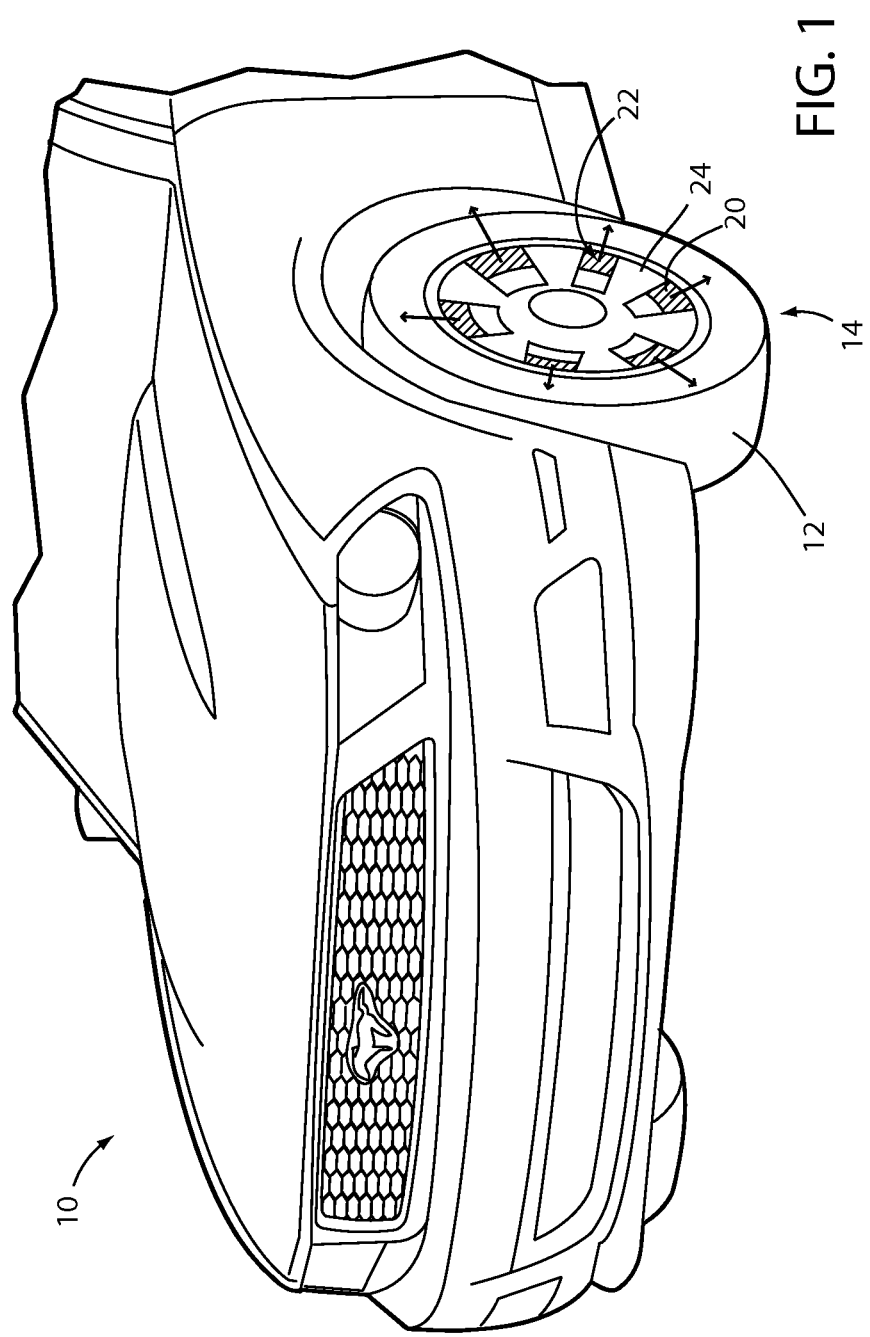
FIG. 1 is a front perspective view of a vehicle comprising a lighting system for illuminating a vehicle wheel assembly.

With reference to FIG. 1, a front portion of a vehicle, or automobile, is illustrated and generally referenced by numeral 10. The vehicle 10 is a wheeled vehicle 10 having four tires 12 that are mounted on a wheel assembly 14. Any number of wheels and any suitable mounting of the wheel assemblies 14 is contemplated within the scope of the disclosed embodiments. Rotatable portions of the wheel assembly 14 rotate about an axis to rotate the tire 12, which in turn produces a rolling motion of the vehicle 10, as known in the art. Additionally, the wheel can be turned to steer the vehicle 10, as known in the art.

The vehicle 10 is shown having a lighting system 16 (FIGS. 3 and 4) configured to illuminate at least a portion of a vehicle wheel assembly 14. For purposes of this disclosure, a wheel assembly 14 includes all components of a vehicle 10 drivetrain, brake assembly, tire assembly, and all other components proximate a knuckle of a vehicle 10. Additionally, the wheel assembly 14 and its various components may be disposed proximate a wheel well of the vehicle 10. The lighting system 16 comprises a light source 18 (FIGS. 5 and 6) disposed on a first component of the wheel assembly 14 and a photoluminescent material 22 disposed on at least a second component of the wheel assembly 14. In some implementations, one photoluminescent portion 26 may comprise a plurality of photoluminescent materials 22.

The photoluminescent portions 26 may cover the full circumference of the interior surface 20 of a vehicle wheel rim 24, or in some embodiments, the photoluminescent material 22 may be placed at discrete locations creating a plurality of photoluminescent portions 26. In an exemplary embodiment, the photoluminescent material 22 covers an interior surface 20 of a vehicle wheel rim 24 and a non-rotational, non-focused light source 18 is configured to emit a high intensity light to illuminate the photoluminescent portion 26 on the interior surface 20 of the vehicle wheel rim 24. Each photoluminescent portion 26 may be configured to illuminate at least one wheel assembly 14 component to provide an ambient glow emitted from the at least one component. Exemplary components on the wheel assembly 14 that may be illuminated include the vehicle wheel rim 24, a brake rotor, a brake caliper, or any other component of a wheel assembly 14.

Figure 2A:
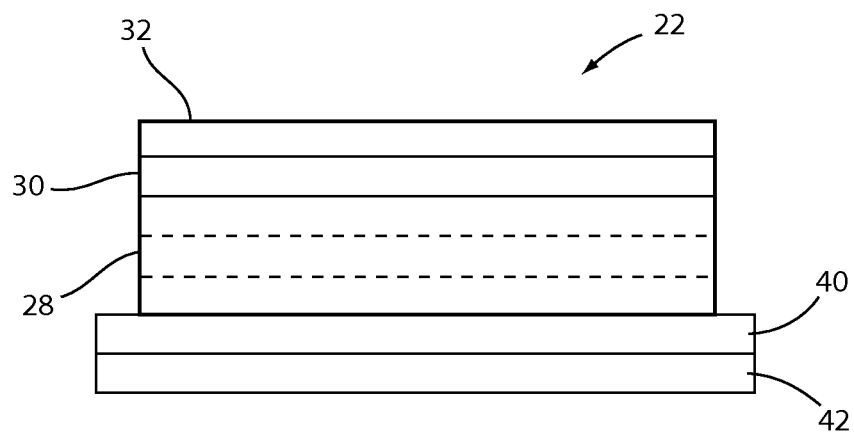
FIG. 2A is a side view of a photoluminescent structure rendered as a coating for use on the wheel assembly according to one embodiment.
Figure 2B:
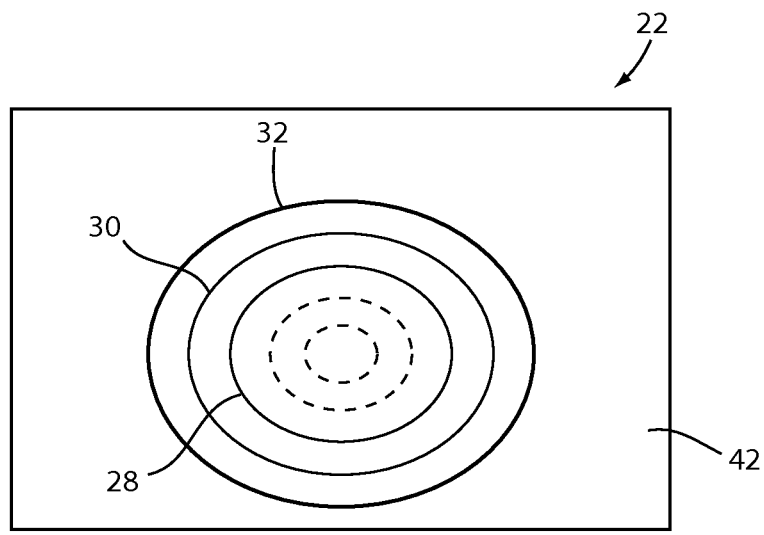
FIG. 2B is a top view of a photoluminescent structure rendered as a discrete particle according to one embodiment.
Figure 2C:
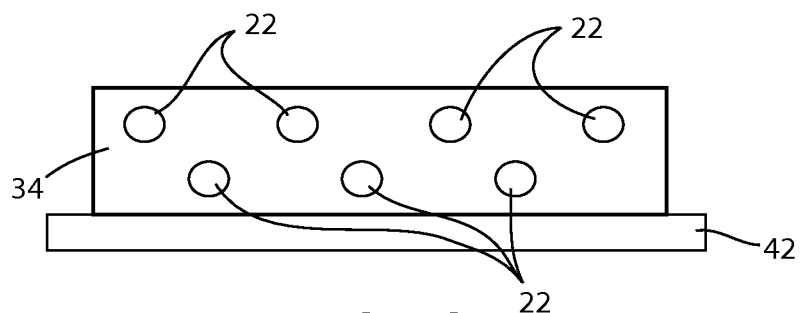
FIG. 2C is a side view a plurality photoluminescent structures rendered as discrete particles and incorporated into a separate structure.

Referring to FIGS. 2A-2C, a photoluminescent material 22 is generally shown in three embodiments rendered as a coating (e.g. a film) capable of being applied to a vehicle component 42, a discrete particle capable of being implanted in a vehicle component 42, and a plurality of discrete particles incorporated into a separate structure capable of being applied to a vehicle component 42, respectively. At the most basic level, the photoluminescent material 22 includes an energy conversion layer 28 that may be provided as a single layer or a multilayer structure, as shown through broken lines in FIGS. 2A and 2B.

The energy conversion layer 28 may include one or more photoluminescent materials 22 having energy converting elements selected from a phosphorescent or a fluorescent material. The photoluminescent materials 22 may be formulated to convert an inputted electromagnetic radiation into an outputted electromagnetic radiation generally having a different wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) corresponds to electromagnetic radiation utilized in the conversion process.

The photoluminescent portion 26 may comprise at least one photoluminescent material 22 comprising an energy conversion layer 28. The energy conversion layer 28 may be prepared by dispersing the photoluminescent material 22 in a polymer matrix 34 to form a homogenous mixture using a variety of methods. Such methods may include preparing the energy conversion layer 28 from a formulation in a liquid carrier medium and coating the energy conversion layer 28 to a desired planar and/or non-planar substrate 40 of a vehicle component 42. The energy conversion layer 28 coating may be deposited on a vehicle component 42 by painting, screen printing, spraying, slot coating, dip coating, roller coating, and bar coating. Additionally, the energy conversion layer 28 may be prepared by methods that do not use a liquid carrier medium.

For example, a solid state solution (homogenous mixture in a dry state) of one or more photoluminescent materials 22 may be incorporated in a polymer matrix 34 to provide the energy conversion layer 28. In instances where one or more energy conversion layers 28 are rendered as particles, the single or multi-layered energy conversion layers 28 may be implanted into a vehicle component 42 or panel. When the energy conversion layer 28 includes a multilayer formulation, each layer may be sequentially coated. Additionally, the layers can be separately prepared and later laminated or embossed together to form an integral layer.

Referring back to FIGS. 2A and 2B, the photoluminescent material 22 may optionally include at least one stability layer 30 to protect the energy conversion layer 28 from photolytic and thermal degradation. The stability layer 30 may be configured as a separate layer optically coupled and adhered to the energy conversion layer 28. The stability layer 30 may also be integrated with the energy conversion layer 28. The photoluminescent material 22 may also optionally include a protective layer 32 optically coupled and adhered to the stability layer 30 or any layer or coating to protect the photoluminescent material 22 structure from physical and chemical damage arising from environmental exposure.

The stability layer 30 and/or the protective layer 32 may be combined with the energy conversion layer 28 to form an integrated photoluminescent material 22 through sequential coating or printing of each layer, or by sequential lamination or embossing. Alternatively, several layers may be combined by sequential coating, lamination, or embossing to form a substructure. The substructure may then be laminated or embossed to form the integrated photoluminescent material 22. Once formed, the photoluminescent material 22 may be applied to a chosen vehicle component 42, feature, or fixture.

In some implementations, the photoluminescent material 22 may be incorporated into a vehicle component 42 as one or more discrete multilayered particles as shown in FIG. 2C. The photoluminescent material 22 may also be provided as one or more discrete multilayered particles dispersed in a polymer formulation that is subsequently applied to a vehicle component 42 or panel as a contiguous structure. Additional information regarding the construction of photoluminescent structures to be utilized in at least one photoluminescent portion 26 of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Referring to FIG. 3, the lighting system 16 is generally shown in one embodiment according to a front-lit configuration 56 to convert the first emission 36 from the light source 18 to the second emission 38. The first emission 36 comprises a first wavelength $\lambda_1$, and the second emission 38 comprises a second wavelength $\lambda_2$. The lighting system 16 may include the photoluminescent material 22 rendered as a coating and applied to a substrate 40 of a vehicle component 42. The photoluminescent material 22 may include the energy conversion layer 28, and in some implementations may include the stability layer 30 and/or protective layer 32. In response to the light source 18 being activated, the first emission 36 is converted from the first wavelength $\lambda_1$ to the second emission 38 having at least the second wavelength $\lambda_2$. The second emission 38 may comprise a plurality of wavelengths $\lambda_2, \lambda_3, \lambda_4$ configured to emit significantly white light from the vehicle component 42.

In various implementations, the lighting system 16 comprises at least one energy conversion layer 28 configured to convert the first emission 36 at the first wavelength $\lambda_1$ to the second emission 38 having at least the second wavelength $\lambda_2$. In order to generate the plurality of wavelengths $\lambda_2, \lambda_3, \lambda_4$, the energy conversion layer 28 may comprise a red-emitting photoluminescent material, a green-emitting photoluminescent material, and a blue-emitting photoluminescent material dispersed in the polymer matrix 34. The red, green, and blue-emitting photoluminescent materials 22 may be combined to generate the significantly white light for the second emission 38. Further, the red, green, and blue-emitting photoluminescent materials 22 may be utilized in a variety of proportions and combinations to control the color of the second emission 38.

Each of the photoluminescent materials 22 may vary in output intensity, output wavelength, and peak absorption wavelengths based on a particular photochemical structure and combinations of photochemical structures utilized in the energy conversion layer 28. As an example, the second emission 38 may be changed by adjusting the wavelength of the first emission $\lambda_1$ to activate the photoluminescent materials 22 at different intensities to alter the color of the second emission 38. In addition to or alternatively to the red, green, and blue-emitting photoluminescent materials 22, other photoluminescent materials 22 may be utilized alone and in various combinations to generate the second emission 38 in a wide variety of colors. In this way, the lighting system 16 may be configured for a variety of applications to provide a desired lighting color and effect for the vehicle 10.

The light source 18 may also be referred to as an excitation source and is operable to emit at least the first emission 36. The light source 18 may comprise any form of light source 18, for example halogen lighting, fluorescent lighting, light emitting diodes (LEDs), organic LEDs (OLEDs), polymer LEDs (PLEDs), solid state lighting or any other form of lighting configured to output the first emission 36. The first emission 36 from the light source 18 may be configured such that the first wavelength $\lambda_1$ corresponds to at least one absorption wavelength of the one or more photoluminescent materials 22 of the energy conversion layer 28. In response to receiving the light at the first wavelength $\lambda_1$, the energy conversion layer 28 may be excited and output the one or more output wavelengths $\lambda_2, \lambda_3, \lambda_4$. The first emission 36 provides an excitation source for the energy conversion layer 28 by targeting absorption wavelengths of the various photoluminescent materials 22 utilized therein. As such, the lighting system 16 is configured to output the second emission 38 to generate a desired light intensity and color.

Referring to FIG. 4, the light system 16 is shown in a front-lit configuration 56 according to another embodiment. In an exemplary embodiment, the light source 18 may be configured to emit the first emission 36 toward the plurality of photoluminescent portions 26. In this embodiment, the plurality of photoluminescent portions 26 comprises a first photoluminescent portion 50, the second photoluminescent portion 52, and a third photoluminescent portion 54. Each of the photoluminescent portions 50, 52, 54 may be configured to convert the first wavelength $\lambda_1$ of the first emission 36 to one or more of the plurality of wavelengths $\lambda_2, \lambda_3, \lambda_4$. In this way, the first emission 36 may be converted into a plurality of emissions originating from each of the photoluminescent portions 50, 52, 54 to generate a multicolored lighting effect.

For example, the first photoluminescent portion 50 may comprise photoluminescent materials 22 in a conversion layer 28 configured to generate the second emission 38. The second photoluminescent portion 52 may comprise photoluminescent materials 22 in a conversion layer 28 configured to generate a third emission 44. The third photoluminescent portion 54 may comprise photoluminescent materials 22 in a conversion layer 28 configured to generate a fourth emission 46. Similar to the energy conversion layer 28, discussed in reference to the embodiment shown in FIG. 3, photoluminescent materials 22 configured to emit light of various colors may be utilized in a variety of proportions and combinations to control the output color of each of the second emission 38, the third emission 44, and the fourth emission 46. Based on a desired lighting effect, each of the emissions 38, 44, 46 may comprise photoluminescent material 22 configured to emit light having substantially similar colors, or a wide variety of color combinations.

Though the plurality to wavelengths is referred to as the wavelengths $\lambda_2 \lambda_3, \lambda_4$, the photoluminescent materials 22 may be combined in various proportions, types, layers, etc. to generate a variety of colors for the second emission 38. The photoluminescent materials 22 may also be utilized in a plurality of photoluminescent portions distributed along a path of the first emission 36 to generate any number of emissions, for example a third emission 44, a fourth emission 46, etc. The third emission 44 may be emitted from the second photoluminescent portion 52 and the fourth emission 46 may be emitted from the third photoluminescent portion 54 disposed on the vehicle 10.

In an exemplary embodiment, the light source 18 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary embodiment, $\lambda_1$ may be approximately equal to 442 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting system 16 due to these wavelengths having limited perceptual acuity in the visible spectrum of the human eye. By utilizing shorter wavelengths for the first wavelength $\lambda_1$, and converting the first wavelength with the conversion layer 28 to at least one longer wavelength, the lighting system 16 creates a visual effect of light originating from the photoluminescent material 22. In this configuration, light is emitted from the photoluminescent material 22 (e.g. the first photoluminescent portion 50, the second photoluminescent portion 52) from locations of the vehicle 10 that may be inaccessible or costly to add conventional light sources requiring electrical connections.

As discussed herein, each of the plurality of wavelengths $\lambda_2, \lambda_3, \lambda_4$ may correspond to a significantly different spectral color range. The second wavelength $\lambda_2$ may correspond to the excitation of a red-emitting photoluminescent material having a wavelength of approximately 622-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material 22 having a wavelength longer than the first wavelength $\lambda_1$ and approximately 430-525 nm. Though the wavelengths $\lambda_2, \lambda_3, \lambda_4$ are discussed herein as being utilized to generate a significantly white light, various combinations of photoluminescent materials 22 may be utilized in the conversion layer 28 to convert the first wavelength $\lambda_1$ to one or more wavelengths corresponding to a variety of colors.

To achieve the various colors and combinations of photoluminescent materials 22 described herein, the lighting system 16 may utilize any form of photoluminescent materials 22, for example phospholuminescent materials, organic and inorganic dyes, etc. For additional information regarding fabrication and utilization of photoluminescent materials to achieve various emissions, refer to U.S. Pat. No. 8,227,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

Figure 5:
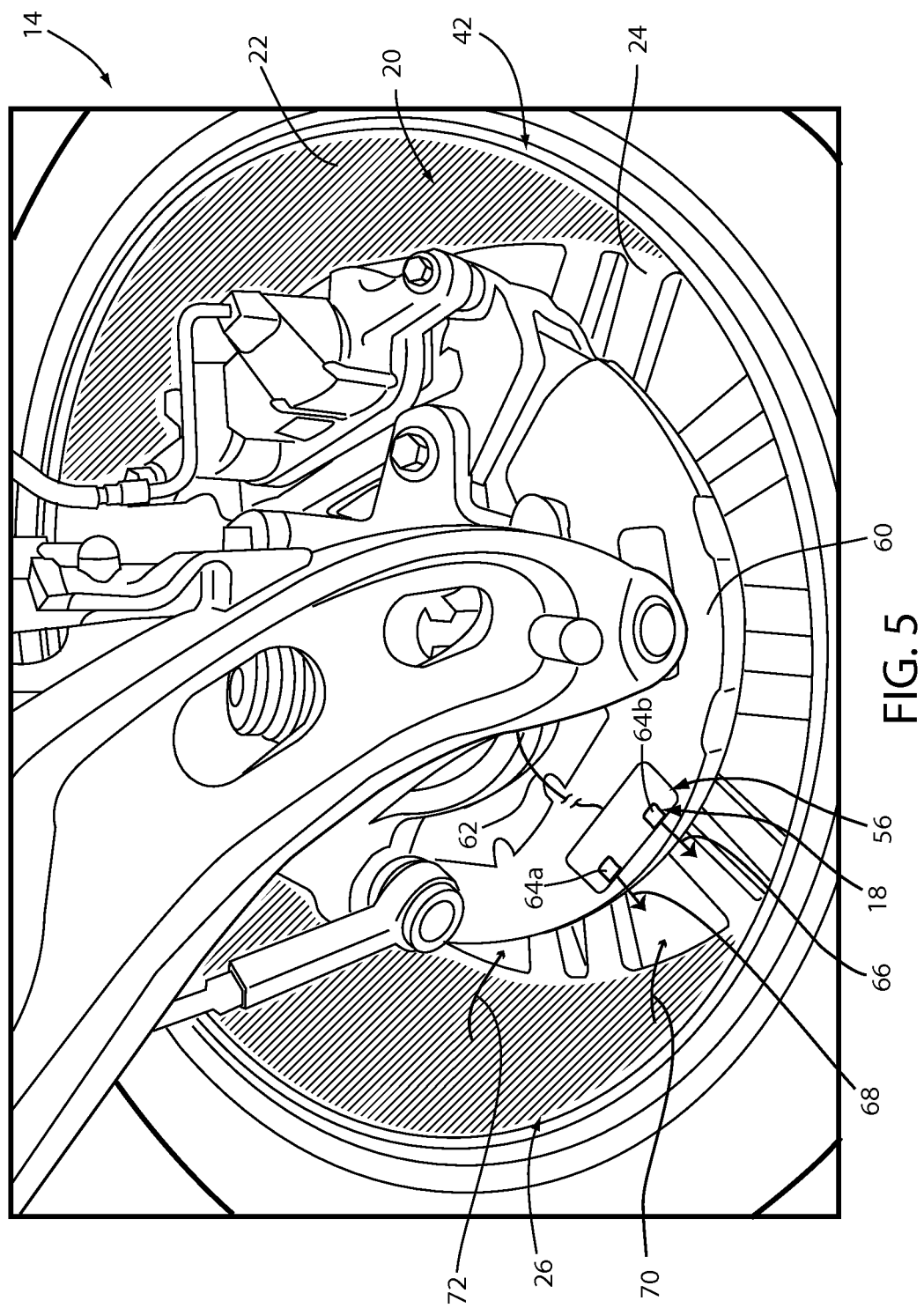
FIG. 5 is a perspective view of a vehicle wheel assembly having a lighting system configured to illuminate a wheel assembly component.

Referring to FIG. 5, a perspective view of a vehicle wheel assembly 14 having a lighting system 16 configured to illuminate a wheel assembly component, according to one embodiment, is illustrated. The wheel assembly 14 may include a component 42, such as a vehicle wheel rim 24, having a photoluminescent portion 26 wherein a photoluminescent material 22 is disposed thereon. The photoluminescent material 22 may be rendered as a film and applied directly to the interior surface 20 of the vehicle wheel rim 24. The wheel assembly 14 further includes a light source 18 located within the assembly to illuminate the photoluminescent material 22 in a front-lit configuration 56. The light source 18 is coupled to an inner surface 60 of the wheel assembly 14 and positioned to face the photoluminescent material 22. The light source 18 is connected to a wheel assembly wiring harness 62 and thereby powered by a vehicle electrical system in this embodiment. In addition, the light source 18 may include a plurality of light emitting diodes (LEDs) 64a, 64b. The light source 18 may be operable to activate LEDs 64a, 64b in any combination to emit non-focused light to illuminate the entirety of the photoluminescent portion 26 of the wheel assembly 14 while the vehicle 10 is in motion or is stationary.

According to the embodiment shown in FIG. 5, a first LED 64a may be configured to emit a first wavelength of light 66 and a second LED 64b may be configured to emit a second wavelength of light 68 having a different wavelength than the first wavelength of light 66. The photoluminescent material 22 may be configured to convert the first wavelength of light 66 to a third wavelength of light 70 and the second wavelength of light 68 to a fourth wavelength of light 72. For purposes of clarity, the wavelengths of light 66, 68 are each exemplarily shown by a single associated light ray in FIG. 5. It should be understood that light emitted from the LEDs 64a, 64b may be evenly distributed across the photoluminescent material 22. Additionally, the emission of light from the photoluminescent material 22 may be substantially Lambertian, that is, the apparent brightness of the photoluminescent portion 26 is substantially constant regardless of an observer's angle of view. Further, each LED 64a, 64b disposed within the wheel assembly 14 could be integrated or formed with another wheel assembly part or component.

The conversion of the first and second wavelengths of light 66, 68 to the third and fourth wavelengths of light 70, 72, respectively, may occur via the process of down conversion, as described previously above. According to one embodiment, the first and/or second wavelengths of light 66, 68 may each correspond to either ultraviolet light (e.g. ~10-400 nanometers in wavelength), violet light (~380-450 nanometers in wavelength), or blue light (e.g. ~450-495 nanometers in wavelength), whereas the third and/or fourth wavelengths of light 70, 72 may each correspond to visible light of a longer wavelength. As defined herein, visible light includes the portion of the electromagnetic spectrum that can be detected by the human eye (e.g. ~390-422 nanometers in wavelength) and may be expressed in a variety of colors defined by a single wavelength (e.g. red, green, blue) or a mixture of multiple wavelengths (e.g. white). Thus, it should be understood that the photoluminescent material 22 may be configured such that the third and fourth wavelengths of light 70, 72 emitted therefrom may be individually expressed as unicolored or multicolored light.

In FIG. 5, photoluminescent material 22 is coupled to an interior surface 20 of the vehicle wheel rim 24 and the light source 18 is coupled to a non-rotational inner surface 60 of the wheel assembly 14. However, it is contemplated that the photoluminescent material 22 may be coupled to any first component of the wheel assembly 14 and the light source 18 may be coupled to any second component of the wheel assembly 14. Additionally, the light source 18 may be part of a second assembly, such as an engine assembly, wherein the light source 18 from the second assembly may illuminate the photoluminescent material 22 within the wheel assembly 14. Moreover, the photoluminescent material 22 may be coupled to either a rotational or non-rotational component of the wheel assembly 14. Similarly, the light source 18, if part of the wheel assembly 14, may be coupled to any rotational or non-rotational wheel assembly component that is practicable.

Figure 6:
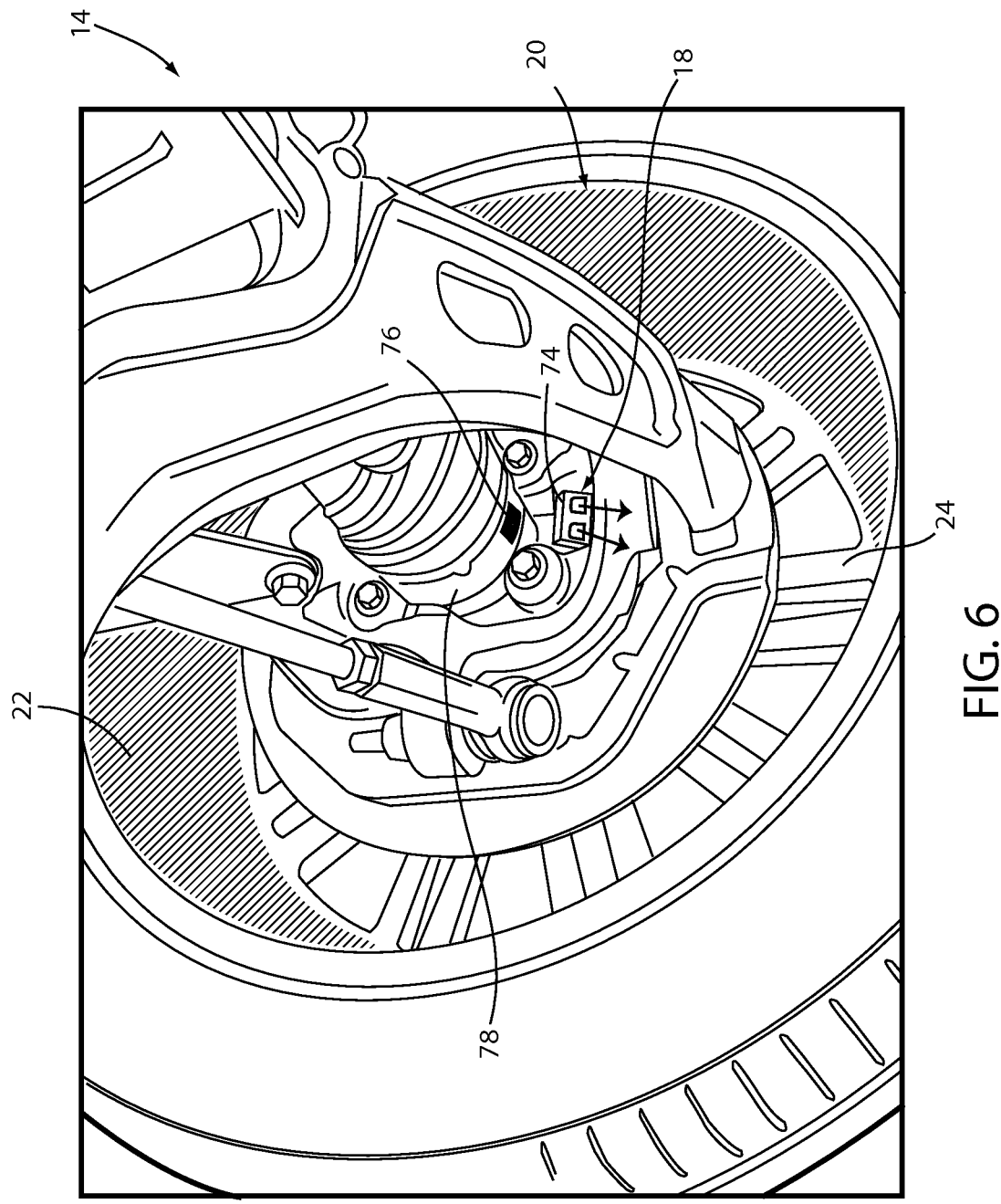
FIG. 6 is a perspective view of a vehicle having a lighting system configured to illuminate at least one wheel assembly component.

Referring to FIG. 6, another embodiment is shown wherein the interior surface 20 of the vehicle wheel rim 24 has a photoluminescent portion 26 having a photoluminescent material 22 disposed thereon and a light source 18 is coupled to a second component of the wheel assembly 14. In this embodiment, power for the light source 18 is provided through a magnetic generator 74. Therefore, in order to generate power, a magnet 76 is placed on a rotational component of the wheel assembly 14, such as the outboard casing of a vehicle half shaft 78, proximate the magnetic generator 74. As the rotational component revolves (e.g., 78), electrical power is generated, which is then used to power the light source 18. The magnet 76 may be an additional component to the wheel assembly 14, integrated with another part of the existing wheel assembly 14, or a portion of a metallic component of the wheel assembly 14 may be magnetized thereby making an additional component unnecessary.

Figure 7:
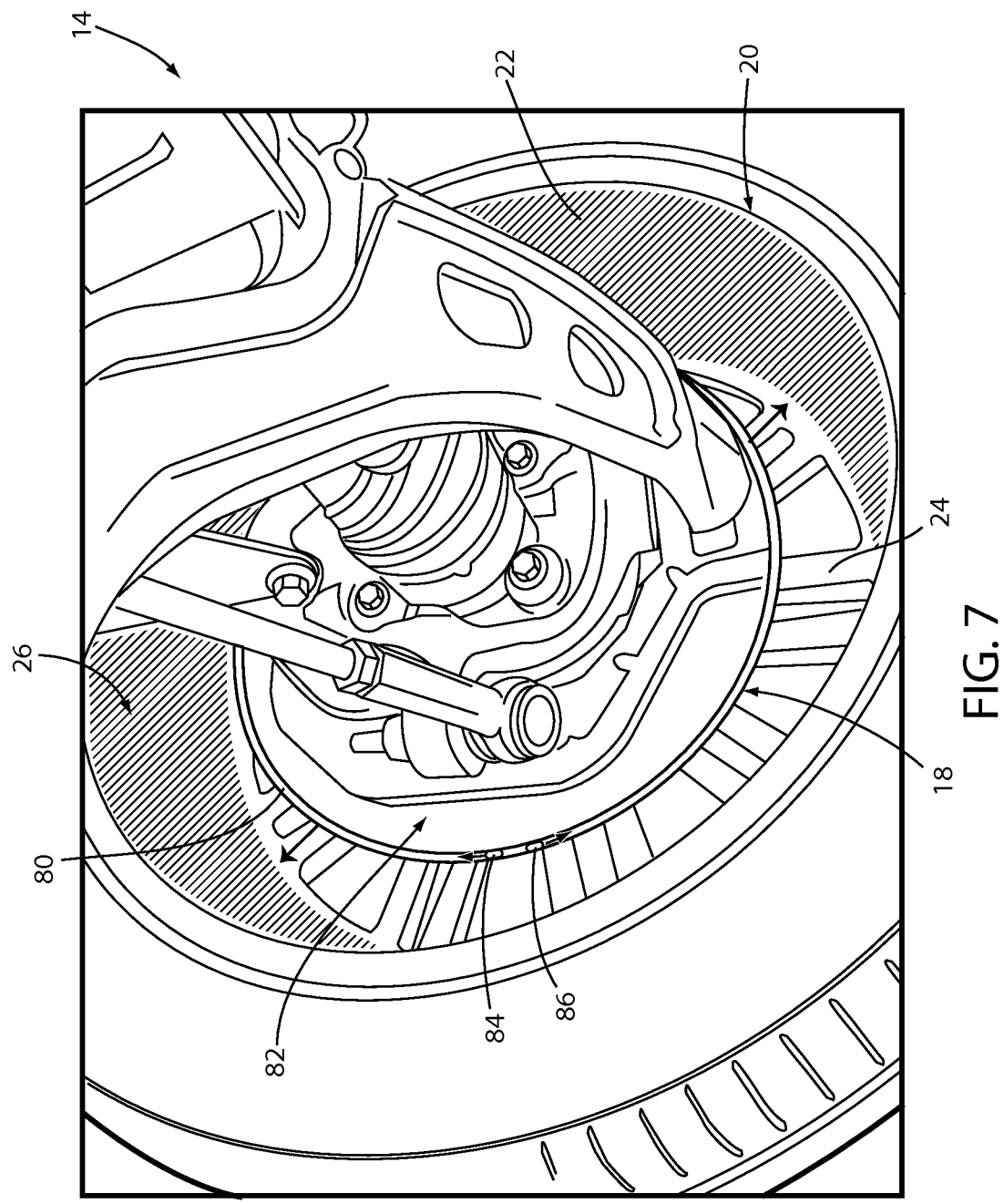
FIG. 7 is a perspective view of a vehicle having a lighting system configured to illuminate at least a portion of a wheel assembly component.

With reference to FIG. 7, another embodiment of wheel illumination using a light pipe is illustrated. A photoluminescent material 22 is provided on the interior surface 20 of a vehicle wheel rim 24. The photoluminescent portion 26 is illuminated through the use of a light source 18. The light source 18, in the illustrated embodiment, is a light pipe 80 that encircles an inner portion 82 of the wheel assembly 14. Alternatively, the light pipe 80 may be coupled to any component of the wheel assembly 14 that is proximate the interior surface 20 of the vehicle wheel rim 24 and positioned to face and illuminate the photoluminescent material 22. The light source 18 may include a single LED 84, or a plurality of LEDs 84, 86 arranged in varying directions within the light pipe 80. The light pipe 80 may be powered through a magnetic generator 74, as described above, or may be powered through a power source disposed within the vehicle 10.

Figure 8:
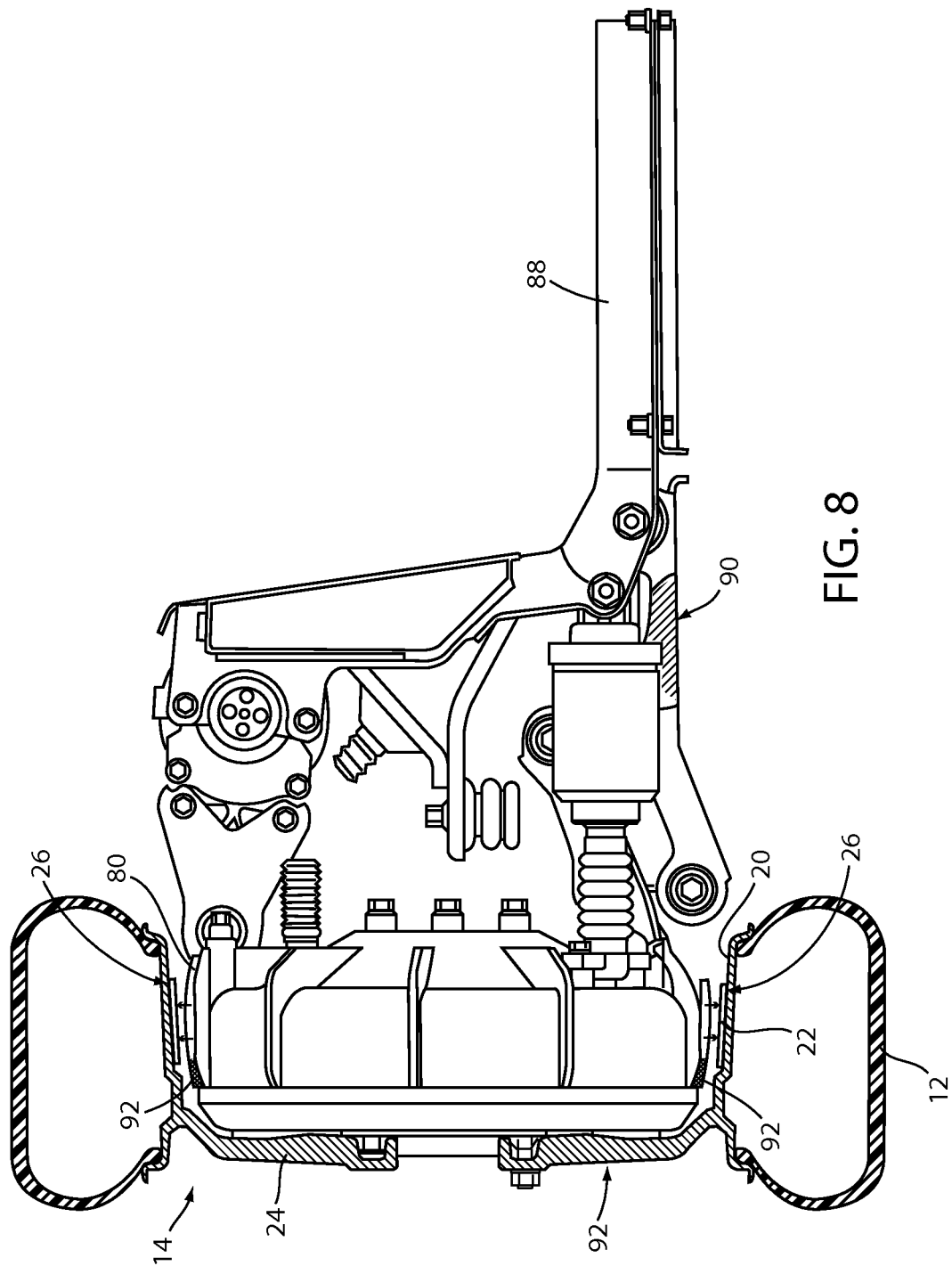
FIG. 8 is an exemplary cross section of a vehicle wheel assembly having a lighting system configured to illuminate at least component of the vehicle wheel assembly.

With reference now to FIG. 8, an exemplary cross section of a wheel assembly 14 is illustrated. In the illustrated embodiment, a light pipe 80 encompasses an inner portion 82 (FIG. 7) of the wheel assembly 14 that is proximate the interior surface 20 of the vehicle wheel rim 24. The interior surface 20 of the vehicle wheel rim 24 contains a photoluminescent portion 26 having at least one photoluminescent material 22 thereon. A light blocking material 92 is disposed on the surface of the light pipe 80 that is furthest outboard. The light blocking material 92 substantially prevents visibility of the light pipe 80 and the light supplied by the light pipe 80 from view by onlookers outboardly adjacent the vehicle wheel assembly 14. Additional photoluminescent portions 26 may be within the wheel assembly 14, such as on the frame 88 of the vehicle 10. The light illumination can assist someone in performing maintenance on a vehicle 10, or may provide a target location for a jack to lift the vehicle 10.

In FIG. 8, the light pipe 80 is illustrated on a non-moving component of the wheel assembly 14 and the photoluminescent material 22 is disposed on the vehicle wheel rim 24. However, it is contemplated that the light source 18 may be disposed on a moving component of the wheel assembly 14 while the photoluminescent material 22 may be disposed on a non-rotational component, such as the brake rotor. Furthermore, the light source 18 and photoluminescent portion 26 may both be non-rotational components of the wheel assembly 14.

Figure 9:
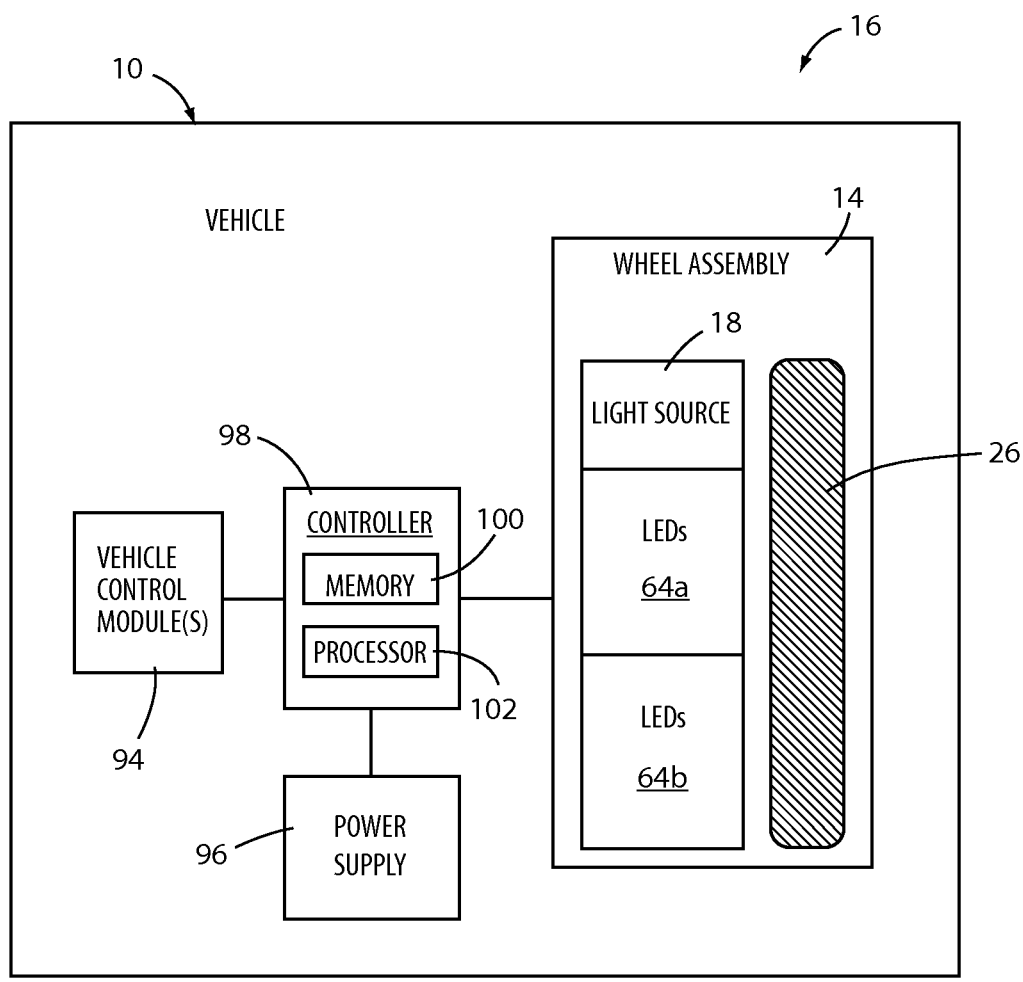
FIG. 9 is a block diagram of the lighting system.

Referring to FIG. 9, a component 42 of a vehicle 10 is shown in which a lighting system 16 is implemented using at least one wheel assembly 14. The lighting system 16 includes a controller 98 in communication with the light source 18 of the wheel assembly 14. The controller 98 may include a memory 100 having instructions contained therein that are executed by a processor 102 of the controller 98. The controller 98 may provide electrical power to the light source 18 via a power supply 96 located onboard the vehicle 10. In addition, the controller 98 may be configured to control the light output of each light source 18 based on feedback received from one or more vehicle control modules 94 such as, but not limited to, a body control module, engine control module, steering control module, brake control module, the like, or a combination thereof. By controlling the light output of the light source 18, the photoluminescent portion 26 may illuminate in a variety of colors and/or patterns to provide ambient light or useful vehicle information to an intended observer. For example, the illumination provided by the photoluminescent portion 26 may be used for numerous vehicle applications, such as, but not limited to, a car finding feature, a remote start indicator, a door lock indicator, a door ajar indicator, a warning indicator, a turn indicator, a break indicator, etc.

In operation, the photoluminescent portion 26 may exhibit a constant unicolor or multicolor illumination. For example, the controller 98 may prompt the light source 18 to emit only the first wavelength of light via LEDs 64a, 64b to cause the photoluminescent portion 26 to illuminate in the first color (e.g. white). Alternatively, the controller 98 may prompt the light source 18 to emit only the second wavelength of light via LEDs 64a, 64b to cause the photoluminescent portion 26 to illuminate in the second color (e.g. red). Alternatively still, the controller 98 may prompt the light source 18 to simultaneously emit the first and second wavelengths of light 66, 68 (FIG. 5) to cause the photoluminescent portion 26 to illuminate in a third color (e.g. pinkish) defined by an additive light mixture of the first and second colors.

In another implementation, the photoluminescent portion 26 may exhibit periodic unicolor or multicolor illumination. For example, the controller 98 may prompt the light source 18 to periodically emit only the first wavelength of light 66 via LEDs 64a, 64b to cause the photoluminescent portion 26 to periodically illuminate in the first color. Alternatively, the controller 98 may prompt the light source 18 to periodically emit only the second wavelength of light 68 via LEDs 64a, 64b to cause the photoluminescent portion 26 to periodically illuminate in the second color. Alternatively, the controller 98 may prompt the light source 18 to simultaneously and periodically emit the first and second wavelengths of light 66, 68 to cause the photoluminescent portion 26 to periodically illuminate in a third color defined by an additive light mixture of the first and second colors. Alternatively still, the controller 98 may prompt the light source 18 to alternate between periodically emitting the first and second wavelengths of light 66, 68 to cause the photoluminescent portion 26 to periodically illuminate by alternating between the first and second colors. The controller 98 may prompt the light source 18 to periodically emit the first and/or second wavelengths of light 66, 68 at a regular time interval and/or an irregular time interval.

With respect to the above examples, the controller 98 may modify the intensity of the emitted first and second wavelengths of light 36, 38 (FIG. 4) by pulse-width modulation or current control. In some implementations, the controller 98 may be configured to adjust a color of the emitted light 36 by sending control signals to adjust an intensity or energy output level of the light source 18. For example, if the light source 18 is configured to output the first emission 36 at a low level, substantially all of the first emission 36 may be converted to the second emission 38. In this configuration, a color of light corresponding to the second emission 38 may correspond to the color of the emitted light from the vehicle component 42. If the light source 18 is configured to output the first emission 36 at a high level, only a portion of the first emission 36 may be converted to the second emission 38. In this configuration, a color of light corresponding to mixture of the first emission 36 and the second emission 38 may be output as the emitted light emitted light 70 (FIG. 5). In this way, each of the light controllers 98 may control an output color of the emitted light 70.

Though a low level and a high level of intensity are discussed in reference to the first emission 36, it shall be understood that the intensity of the first emission 36 may be varied among a variety of intensity levels to adjust a hue of the color corresponding to the emitted light 70 from the vehicle component 42. As described herein, the color of the second emission 38 may be significantly dependent on the particular photoluminescent materials 22 utilized in the photoluminescent portion 26. Additionally, a conversion capacity of the photoluminescent portion 26 may be significantly dependent on a concentration of the photoluminescent materials 22 utilized in the photoluminescent portion 26. By adjusting the range of intensities that may be output from the light source 18, the concentration and proportions of the photoluminescent materials 22 in the photoluminescent portion 26, and the types of photoluminescent materials 22 utilized in the photoluminescent portion 26, the lighting devices discussed herein may be operable to generate a range of color hues of the emitted light 70 by blending the first emission 36 with the second emission 38.

Accordingly a lighting system 16 employing an illuminating wheel assembly 14 has been advantageously described herein. The lighting system 16 may provide various benefits including a simple and cost-effective means to produce a variety of illumination that may be used as a styling feature and/or to inform an intended user of a particular vehicle status.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination apparatus for a vehicle wheel comprising:
   a photoluminescent portion disposed on a surface of a rim; and
   a light source located on an inner, second component of the wheel, the light source configured to emit light at a first wavelength directed toward the photoluminescent portion, wherein the photoluminescent portion is configured to convert the first wavelength to a second wavelength.

2. The illumination apparatus according to claim 1, wherein the photoluminescent portion is configured as a coating that is disposed on an interior surface of the vehicle rim.

3. The illumination apparatus according to claim 1, wherein the light source is coupled to a non-rotational component of the wheel and the photoluminescent portion is disposed on a rotational component.

4. The illumination apparatus according to claim 1, wherein the first wavelength is in a blue color range approximately less than 500 nm.

5. The illumination apparatus according to claim 1, wherein the second wavelength is longer than the first wavelength to illuminate the first component.

6. The illumination apparatus according to claim 1, wherein the light source is powered by a generator located within the wheel.

7. The illumination apparatus according to claim 1, wherein the light source is powered by a vehicle electrical system through the wheel wiring harness.

8. An illumination system for a vehicle wheel assembly, the assembly comprising:
   a photoluminescent portion disposed on a component of the assembly and containing more than one photoluminescent material;
   a generator attached to the wheel assembly to generate electrical power; and
   first and second light sources facing the component, powered by the generator, and configured to emit various wavelengths of light, wherein the photoluminescent portion luminesces in response to receiving the various wavelengths of light.

9. The illumination system according to claim 8, wherein the photoluminescent portion comprises a coating sprayed on a portion of a vehicle wheel rim.

10. The illumination system according to claim 8, wherein the photoluminescent portion comprises a coating on a brake assembly.

11. The illumination system according to claim 8, wherein the photoluminescent portion luminesces in a wavelength of light that is longer than the various wavelengths of light emitted by the first and second light sources.

12. The illumination system according to claim 8, wherein the first and second lights sources are located on an inner portion of the wheel assembly.

13. The illumination system according to claim 8, wherein the first and second light sources are configured to emit light at approximately the same wavelength.

14. The illumination system according to claim 8, wherein the generator further comprises a magnet disposed on a rotational component of the wheel assembly.

15. A lighting system for an automobile wheel assembly, comprising:
- a light source configured to emit light at a first wavelength disposed on a first wheel assembly component optically coupled with a light pipe, the light pipe surrounding the first wheel assembly component and having a geometry similar to a vehicle rim; and
- a photoluminescent portion coupled to the rim, wherein the photoluminescent portion is configured to convert the first wavelength to a second wavelength.

16. The system according to claim 15, wherein the light pipe includes a light blocking material on an outboard portion thereof.

17. The system according to claim 15, wherein the photoluminescent portion is circumferentially disposed on an interior surface of the rim.

18. The system according to claim 15, wherein the photoluminescent portion is disposed on a brake caliper.

19. The system according to claim 16, wherein the light blocking material is configured to maintain light at the first wavelength within an inner portion of the wheel assembly.

20. The system according to claim 15, wherein the first wavelength is in a blue color range approximately of less than 500 nm.

* * * * *